(12) United States Patent
Dovey et al.

(10) Patent No.: US 8,701,001 B2
(45) Date of Patent: *Apr. 15, 2014

(54) SCREEN CAPTURE

(75) Inventors: Esther L. Dovey, North Baddesley (GB); Emma L. Grove, Southampton (GB); Keira L. Hopkins, Eastleigh (GB); Adam J. Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,410

(22) Filed: Jan. 27, 2012

(65) Prior Publication Data

US 2012/0221946 A1 Aug. 30, 2012

(30) Foreign Application Priority Data

Jan. 28, 2011 (EP) .................................... 11152532

(51) Int. Cl.
*G06F 17/27* (2006.01)
*G06F 17/28* (2006.01)

(52) U.S. Cl.
USPC .................... 715/273; 715/204; 705/14.49

(58) Field of Classification Search
USPC ........................................................ 715/273
See application file for complete search history.

(56) References Cited

U.S. PATENT DOCUMENTS

| | | | |
|---|---|---|---|
| 5,845,084 A | 12/1998 | Cordell et al. | |
| 2001/0023436 A1 | 9/2001 | Srinivasan et al. | |
| 2006/0277472 A1* | 12/2006 | Yodo et al. ................... | 715/738 |
| 2009/0089448 A1* | 4/2009 | Sze et al. ...................... | 709/231 |
| 2009/0198731 A1 | 8/2009 | Noonan, III | |
| 2010/0011354 A1* | 1/2010 | Gharabally et al. .......... | 717/178 |
| 2010/0174992 A1* | 7/2010 | Portman et al. ............... | 715/738 |
| 2010/0287338 A1* | 11/2010 | An ................................ | 711/114 |
| 2011/0173564 A1* | 7/2011 | Margarint et al. ............ | 715/786 |
| 2011/0282651 A1* | 11/2011 | Nygaard et al. .................. | 704/9 |
| 2012/0010995 A1* | 1/2012 | Skirpa et al. ............... | 705/14.49 |
| 2012/0060082 A1 | 3/2012 | Edala et al. | |
| 2012/0144286 A1* | 6/2012 | Bank et al. .................... | 715/230 |
| 2012/0159385 A1* | 6/2012 | Duncan et al. ................ | 715/800 |

OTHER PUBLICATIONS

Dovey et al., "Screen Capture," U.S. Appl. No. 13/564,937, filed Aug. 2, 2012, 22 pages.

Office Action, dated Feb. 8, 2013, regarding USPTO U.S. Appl. No. 13/564,937, 28 pages.

Final Office Action, dated Jul. 2, 2013, regarding USPTO U.S. Appl. No. 13/564,937, 36 pages.

* cited by examiner

*Primary Examiner* — James J Debrow
(74) *Attorney, Agent, or Firm* — Yee & Associates, P.C.; Libby Z. Toub

(57) ABSTRACT

A method and system for screen capture are provided. The method includes: selecting a screen area; determining properties of an open window displayed in the screen area, including determining the position of the window and the application and current application data; using image processing to detect scroll bars within the application data of the open window, including detecting the position of the slider in the scroll bar; and saving metadata of the screen area including the open window and the scroll bars as a file. The metadata file re-creates the screen area including the open window with the application data in the correct position within the application.

3 Claims, 4 Drawing Sheets

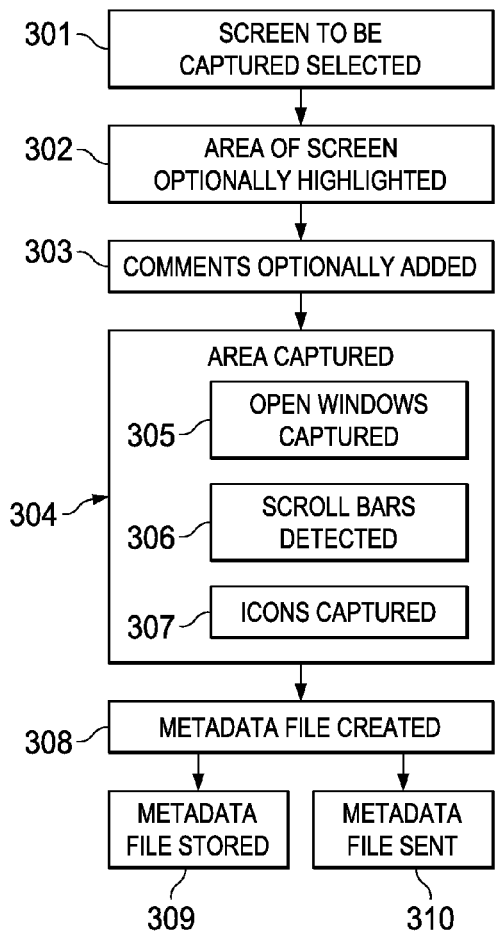
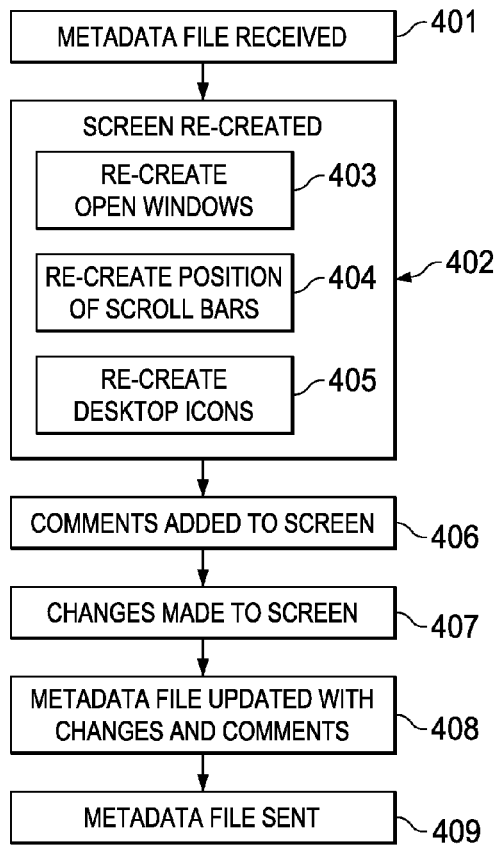

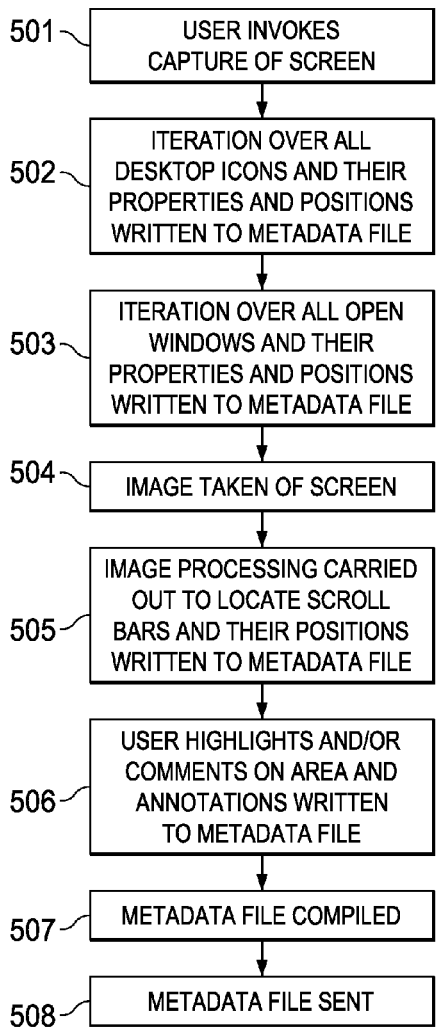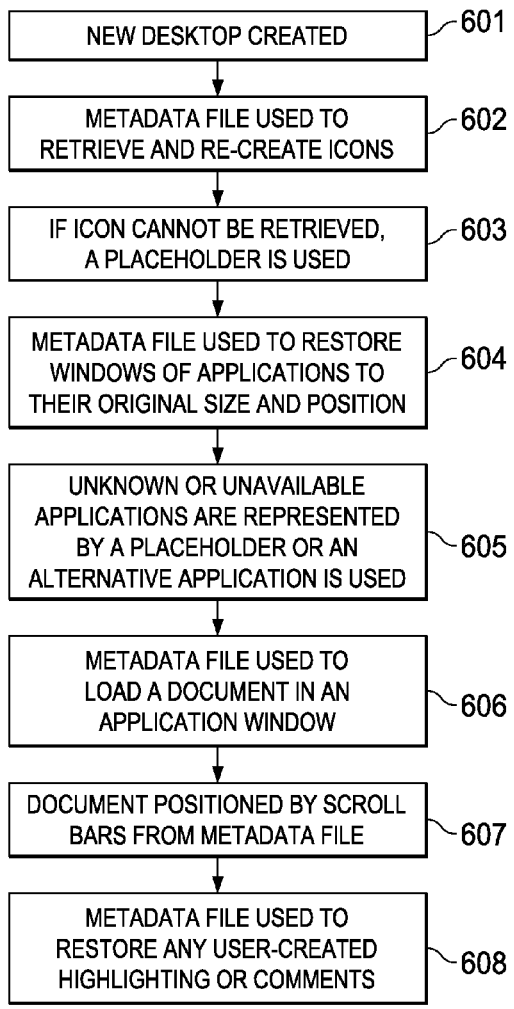

SCREEN CAPTURE

BACKGROUND

1. Field

This invention relates to the field of screen capture. In particular, the invention relates to screen capture including capture of positions in documents.

2. Description of the Related Art

Screen capture is a useful tool for recording a current screen content including a desktop and open applications and/or documents.

In an example scenario, an information developer working on a product information center may find it difficult to collaborate with development and test teams on the information center content. In this case, screen capture is often used.

A screen capture of the information center can be taken, and the specific content to be discussed can be cropped and highlighted. The screen capture can be pasted in an email, and then the user can describe around where the specific content can be found in the information center in order to provide a complete picture, before sending the email onto colleagues. Email is often the only communication option if the teams are not available for collaboration in person, by phone, or over instant messaging, particularly if the team members work in different time zones.

However, screen captures can be very costly in memory and size, and can be grainy and unclear. Furthermore, recipients may "Reply to all" when responding to emails to keep a track history, meaning that a collaborative discussion back and forth over email can easily mount and result in an exceeded content limit, and an out of action in-basket.

If screen captures are not used, it is also very timely to talk around where the specific content exists to start a collaborative discussion, and the discussion can easily be misinterpreted, and costly in time as a result. This is not only an issue for information developers but also for testers and developers. For example, screen capture may be used for describing exactly where in an application a specific error has been found, or describing exactly which node panel contains a property value that is not correctly mirroring the agreed specification.

Screen capture may also be used for computer restores in order to restore a computer to the same position. Again, current screen capture techniques are costly in memory and size.

Therefore, there is a need in the art to address the aforementioned problem.

SUMMARY

According to a first aspect of the present invention there is provided a method for screen capture, comprising: selecting a screen area; determining properties of an open window displayed in the screen area, including determining the position of the window and the application and current application data; using image processing to detect scroll bars within application data of the open window, including detecting the position of the slider in the scroll bar; and saving metadata of the screen area including the open window and the scroll bars as a file; wherein the metadata file re-creates the screen area including the open window with the application data in the correct position within the application.

According to a second aspect of the present invention there is provided a system for screen capture, comprising: a processor; an area selection component for selecting a screen area; an information gathering component including: a window gathering component for determining properties of an open window displayed in the screen area, including determining the position of the window and the application and current application data; and a scroll bar determining component for using image processing to detect scroll bars within application data of the open window, including detecting the position of the slider in the scroll bar; and a metadata file creator for saving metadata of the screen area including the open window and the scroll bars as a file; wherein the metadata file re-creates the screen area including the open window with the application data in the correct position within the application.

According to a third aspect of the present invention there is provided a computer program stored on a computer readable medium and loadable into the internal memory of a digital computer, comprising software code portions, when said program is run on a computer, for performing the method of the first aspect of the present invention.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

BRIEF DESCRIPTION OF THE SEVERAL VIEWS OF THE DRAWINGS

FIG. 3 is a flow diagram of a first aspect of a method in accordance with the present invention;

FIG. 4 is a flow diagram of a second aspect of a method in accordance with the present invention;

FIG. 5 is a flow diagram of a third aspect of a method in accordance with the present invention; and FIG. 6 is a flow diagram of a fourth aspect of a method in accordance with the present invention.

DETAILED DESCRIPTION

Figure 1:
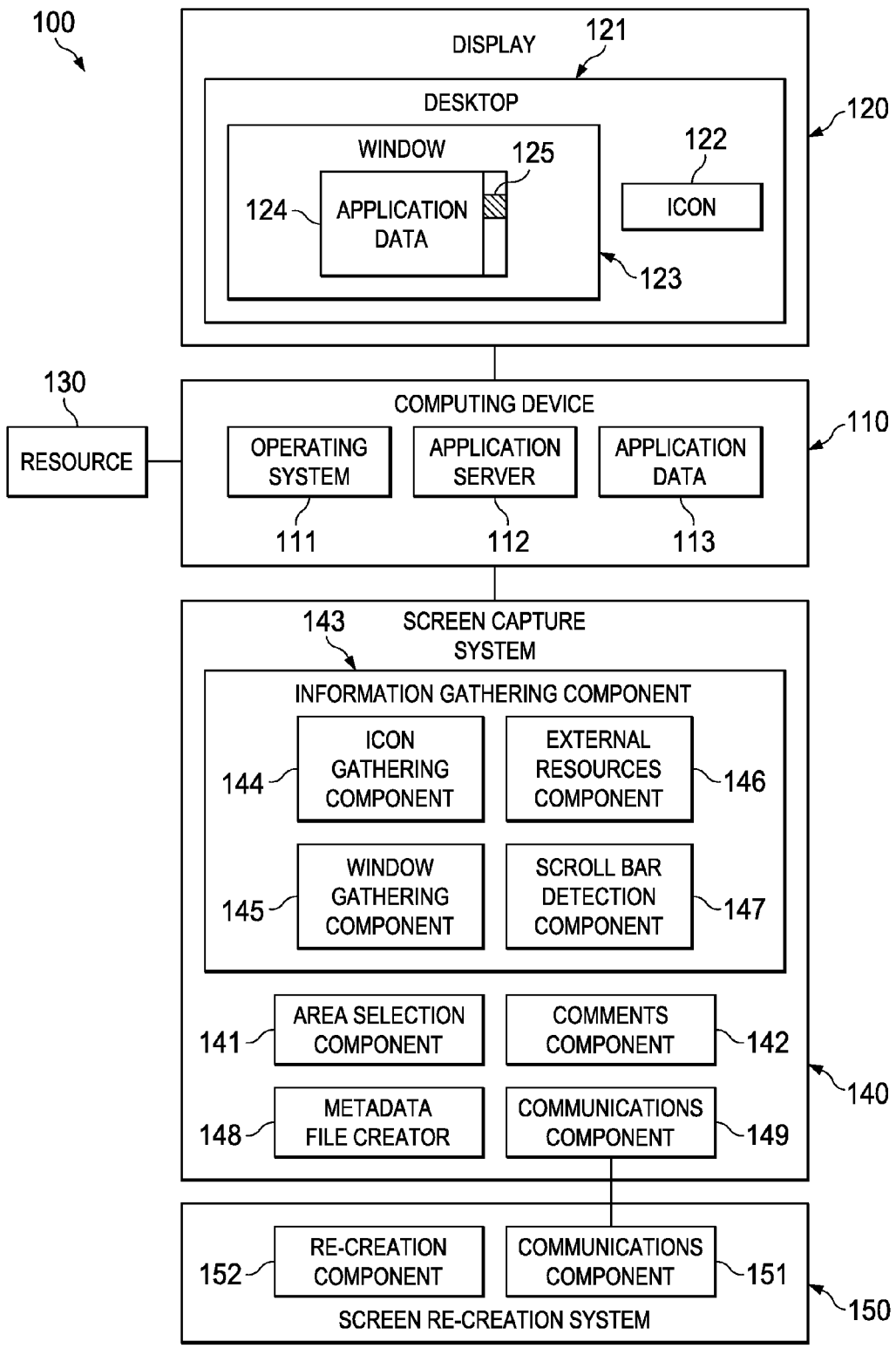
FIG. 1 is a block diagram of a first embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are described in which screen capture is carried out of a screen including one or more open application windows. A position of application data is captured using scroll bar detection so that the application data can be restored at the correct point in the data.

Application data may be a file such as a document or resource, a URL (if a browser application is being used), embedded data in the metafile, data on a shared drive, or basically any data that is read and displayed by the application. The application can accept data from a number of sources. A file open call by an application opens a file and can open from a number of different sources.

The restoration may be at the same machine in the case of a computer crash or at a target machine for collaboration purposes. The screen capture is carried out by generating a metadata file which is sufficiently small to store or transfer without high memory or transfer overheads.

The screen capture takes a snapshot of a screen and uses image processing techniques to determine the location of scroll bars to re-create the screen with the data shown in the application correctly positioned.

The described method and system generate a metadata file containing information about open applications and documents to capture icons, windows, display text and non-text data, and desktop set up in true color definition. The user may also add highlighting and comments which are also represented in the metadata file.

Using image processing techniques, such as feature or edge detection, the scroll bars are located and the size and relative position of the slider within the scroll bar is noted. This allows a position within a document to be later restored. Horizontal and vertical scroll bars may be located.

The metadata file is a small piece of information which may be sent to an end user and used to re-create the screen at the other end. One or more particular applications and application data can be restored or the whole desktop. If the whole desktop is restored, place holders can be used for icons etc. that represent applications that the target machine does not have installed.

The described system enables a recipient to re-create the screen and any highlighting and comments of the sender, change the data, and send an updated snapshot of the screen back to the sender or to another recipient.

Referring to FIG. 1, a block diagram shows an example embodiment of the described system 100.

A computing device 110 is provided with an operating system 111, applications 112, and application data 113 which may be opened via an application 112. The computing device 110 has a display device 120 on which a desktop 121 may be displayed with icons 122 as well as windows 123 for open applications and application data 124 within the applications. The windows 123 for application data 124 may include scroll bars 125, which may be vertical or horizontal, showing a current location within the application data 124. The computing device 110 may access external resources 130, for example, via the Internet or a network connection, and may display the resources 130 on the display device 120, for example, in a browser application window.

In the described system, a screen capture system 140 is provided for capturing the contents of a display device 120. The screen capture system 140 may be local to the computing device 110 or remote with access to the computing device via a network.

The screen capture system 140 may include an area selection component 141 for selecting an area of a screen of a display device 120 to be captured. Alternatively, an entire screen may be captured. A comments component 142 may be provided which allows a user to add highlighting and/or comments to the screen, which may also be captured.

The screen capture system 140 may include an information gathering component 143. The information gathering component 143 may include an icon gathering component 144 for gathering properties and positions of icons from the desktop. The information gathering component 143 may also include a window gathering component 145 which uses application programming interfaces (APIs) of the window manager or operating system to gather information on the open window contents. The information gathering component 143 may also include an external resource component 146 for adding addresses of external resources to the gathered information. The information gathering component 143 may also include a scroll bar detection component 147 for detecting the position of each scroll bar 125 of an open window 123 to determine the current position within the application data 124 being viewed in the application of the open window 123.

A metadata file creator 148 collects all the information about the screen content including the scroll bar positions, and creates a metadata file.

The screen capture system 140 may include a communications component 149 for sending the metadata file to another target computing device where the screen contents may be re-created. Alternatively, the screen capture system 140 may store the metadata file as a backup for the computing device 110.

Additionally, a screen re-creation system 150 may be provided. The screen re-creation system 150 may be provided for use at a target computing device for re-creating a captured screen contents or at the originating device when receiving an updated annotation of a screen capture back from a collaborator. The screen re-creation system 150 may include a communications component 151 for receiving a metadata file of screen content and a re-creation component 152 for converting the metadata file into screen content for displaying further details of which are described below.

The screen capture system interrogates the operating system for open applications and application data to capture icons, windows, display text and non-text data, and desktop set up in true color definition. The screen capture system allows the user to highlight specific content of interest to bring attention to specific discussion points, allows for text entry to promote collaboration, and offers the end user the same functionality by coordinating the positioning of the scroll bar so a colleague's operating system can re-create the end-to-end capture.

The re-creation of the screen works even if the application is full screen on a source machine but only used at half screen on a target machine. For example, the resolution from a source full screen may be taken and scaled to suit a different screen size or portion of screen on the target machine. It therefore does not matter what the resolution of the source or target is, because a scaling factor is applied, which is only needed if the target system resolution is smaller than the source.

Figure 2:
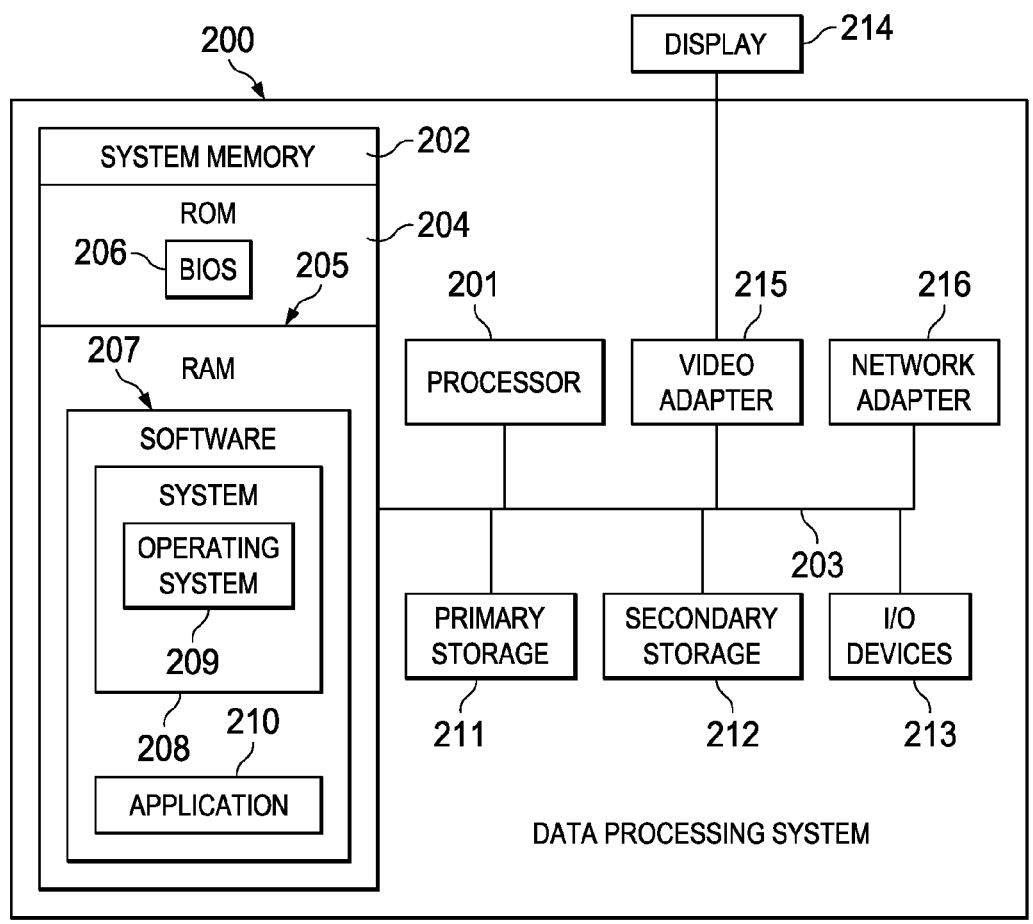
FIG. 2 is a block diagram of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Referring to FIG. 3, a flow diagram 300 shows an embodiment of the described method. A screen to be captured is selected 301, for example, using a predefined hot key. An area of the screen may be highlighted 302, for example, by using squared or circular area highlighting or a highlighting pen facility. Text may be added 303 to provide comments. The highlighted and annotated screen selected area is then captured 304 including capturing 305 open window data, scroll bar detection 306, and capturing 307 icons. A metadata file is created 308 to save the captured information. The metadata file is small in size (for example, less than 20 KB). The metadata file is then stored 309 (as a backup record), or sent 310 to another user for collaborative use.

Referring to FIG. 4, a flow diagram 400 shows an embodiment of the described method at a receiver. A metadata file is received 401 and a screen is re-created 402 as a screen view including re-creating 403 open windows with scroll bar positions re-created 404 in open applications. A scaling factor may be applied if the receiver screen is not of the same scale as the source screen. Desktop icons may also be re-created 405.

New comments may be added 406 to the screen view and other changes may be made 407 to the screen contents. The new screen view may be captured as before, or the existing metadata file may be updated 408. The updated metadata file may be sent 409 back to the user and this process may be repeated until the content is agreed or no further comments are input.

Setup

The host operating system or window manager modifies the File/Open calls and dialogue boxes so that it can record the files which are opened either programmatically by an application or selected by a user.

Metadata File Generation

Referring to FIG. 5, a flow diagram 500 shows in more detail an example embodiment of the method when a user wants to generate a screen capture metadata file.

The user presses a predefined hot key to invoke 501 the capture (for example, the windows key+C). An iteration is made 502 over all icons on the desktop and their properties and positions written to the metadata file. An iteration is made 503 over all windows that are open on the screen, with their properties and positions written to the metadata file. The properties of open windows include the application and the location and properties of the currently open application data such as a file or a document, which are written out. The hooking of the file open calls allows the file details to be known.

An image is taken 504 of the screen, and knowing the position of each application allows it to be found within the image. Image processing is carried out (for example, using feature or edge detection techniques) to locate the scroll bars 505, and the size and relative position of the scroll bar marker is written to the metadata file. This will allow the position within the document to be later restored.

Optionally, the user is allowed to drag resizable windows over the screen which can then be used to highlight 506 areas for collaboration or to be referred to. Comments may also be added.

The size, position and color characteristics are then compiled 507 in the metadata file. The metadata file may then be sent 508, for example, by attachment to an e-mail or in an instant messaging session.

The following is a basic example of a metadata file in XML format. The metadata file may contain more features, for example: a URL may be used, or network path, or the file may be encoded in the URL, etc. □

```
<desktop>□
<icons>
<icon text="Web Browser" image="location of image" xpos="0" ypos="0" />
</icons>
<applications>
<application name="browser" xpos="0" ypos="0" height="480" width="640"
bin="browser.exe" path="c:\program files\browser_v1">□
<file name="mydata" path="URL or network path or embedded data">□
<scrollbar slider_height="40" slider_y="10"/>□
</file>□
</application>□
</applications>□
<focus_boxes>□
<box xpos="10" ypos="10" height="100" width="100" color="red">□
Comments to display are typed in here:
</box>□
</focus_boxes>□
</desktop>
```

An example embodiment of the steps carried out by a feature or edge detection method may be as follows:

Process a screen using an established feature or edge processing technique—all edges may be held in memory.

Starting from the right-hand side of the screen shot, process all vertical edges. Note that two parallel edges are being looked for which denote a scroll bar. (The actual width of the scroll bar may be determined based on the properties of the window manager).

2.1 Find suitable parallel lines from the edges found in step 1. Then steps 2.2. or 2.3 may be used to find the slider within the scroll bar.

2.2 Move up parallel edges looking for a horizontal edge.
2.2.1 If edge=top of parallel lines then slider is not this way.
2.2.2 If edge≠top of parallel lines then slider found.
2.3 Move down parallel edges.
2.3.1 If edge=top of parallel lines then slider is not this way.
2.3.2 If edge!=top of parallel lines then slider found.

Scan slider until next horizontal edge is found. Now have height of slider—width is not important.

The same process may be used for horizontal scroll bars by starting from the bottom or top of the screen shot and processing all horizontal edges looking for two parallel edges which denote a scroll bar. The position of the slider within the scroll bar is then found.

The use of existing operating system APIs protects the capture system against operating system changes that would make a proprietary rendering tool obsolete. The specific APIs to use will vary depending on the operating system. For example, Windows User (Windows is a trade mark of Microsoft Corporation) is a component of the Microsoft Windows operating system that provides core functionality for building simple user interfaces and includes functionality for window management, message passing, input processing and standard controls.

The resource to be collaborated on could be stored in a central location, in which case a URL or path to the resource might be sufficient for the re-creation of the desktop, or the resource might be embedded in the metadata file. This could be a choice available to the creator of the desktop capture, depending on their method of collaboration. As the method may be used as a collaborative solution, it is expected that the second user has the resource, has access to the resource, or can be given the resource.

The format of the metadata file may be XML, in which case the information stored for an icon might appear as follows:
<icon positionx="x" positiony="y" image="icon image path"/>

The metadata file may also be binary, or some other format. The size of the metadata file may be less than 1 KB, depending on the desktop to be captured, and whether resources are embedded.

Metafile Reconstruction

Referring to FIG. 6, a flow diagram 600 shows in more detail an example embodiment of the method when the user receives a metadata file. The steps are used to reconstruct the desktop ready for collaboration.

The operating system or window manager creates 601 a new desktop. The information in the metadata file may be used to retrieve and re-create 602 the icons, with correct size and position. If the icon cannot be restored, a placeholder may be used 603.

The information in the metadata file may be used to restore 604 windows of applications with their original size and position. Unknown/unavailable applications may be represented 605 by using placeholder windows, or if the application is not available, the agent might choose an alternative similar application. Placeholder windows may contain information about the required application, a link to download the required application, or a choice of alternative applications that are available on the machine.

The information in the metadata file may be used to load 606 the application data, such as a document or resource, in the appropriate window. The application data is positioned 607 so that the scroll bar markers are the same as when the metadata file was created. This ensures the same view of the application data is presented to the user.

The information in the metadata file may be used to restore 608 any user-created highlight windows or comments.

The second user now has a desktop that matches the original, complete with documents or resources open, positioned, and ready to be edited.

The described method and system define a set of metadata which describes the environment in close enough detail to allow it to be reproduced on another computing device. This metadata could form the basis of a standard for information exchange in many different collaboration scenarios. It could also be used to pass layout information within instant messaging screen sharing applications, such that the screen is reproduced (fast) locally rather than waiting for the whole screen image to be downloaded and displayed.

The described screen capture increases productivity, gives the correct focus, allows the end user to immediately see information in context, and offers no margin for misinterpretation. The transfer is fast to send over email or instant messaging as it is memory and size friendly. The screen capture can be safely stored for historical or audit purposes without breaching email tier limits, offers true color definition, and can be used by colleagues in split time zones and at times of limited availability.

A desktop may be restored with correctly positioned data within applications without recording user interactions. Due to the small size of the metadata file, communication of the screen capture may be carried out over dial-up connections and in areas where broadband/fiber access is not possible.

A screen capture system may be provided as a service to a customer over a network.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable storage medium providing program code for use by or in connection with a computer or any instruction execution system. For the purposes of this description, a computer-usable or computer-readable storage medium can be any apparatus that can store the program for use by or in connection with the instruction execution system, apparatus or device. A computer-usable or computer-readable storage medium does not include a propagation medium, such as a signal or carrier wave.

The computer-usable or computer-readable storage medium can be an electronic, magnetic, optical, or semiconductor system (or apparatus or device). Examples of a computer-usable or computer-readable storage medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A system for screen capture, the system comprising:
   a bus system;
   a storage device connected to the bus system, wherein the storage device stores program code; and
   a processor connected to the bus system, wherein the processor executes the program code to:
      select a screen area at a source machine;
      determine properties of an open window displayed in the screen area, including determining position of the open window, and an application and current application data associated with the open window, by hooking file open calls for the application, wherein application programming interfaces of an operating system are used to gather information on the properties of the open window;
      use image processing to detect scroll bars within the application data of the open window;
      highlight an area of the screen area;
      annotate the screen area with comments;
      save metadata of the screen area, including the open window, highlighting of the area of the screen area, annotating of the screen area with comments, and the scroll bars, as a metadata file, wherein the metadata file re-creates the screen area including the open window with the application data in a correct position within the application;

send the metadata file to a recipient machine, wherein an alternative application that is available on the recipient machine is used in response to the application being unavailable on the recipient machine;

re-create the screen area at the recipient machine using the metadata file, wherein re-creating of the screen area includes retrieving and re-creating icons in the screen area, wherein a placeholder is used when an icon is not retrieved;

apply a scaling factor to the re-created screen area in response to a screen size on the recipient machine being different from a screen size on the source machine;

annotate the re-created screen area;

update the metadata file with the annotating of the re-created screen area; and send the updated metadata file to the source machine.

2. A computer program product stored on a non-transitory computer-readable storage medium having program code embodied thereon for screen capture, the computer program product comprising:

program code for selecting a screen area at a source machine;

program code for determining properties of an open window displayed in the screen area, including determining position of the open window, and an application and current application data associated with the open window, by hooking file open calls for the application, wherein application programming interfaces of an operating system are used to gather information on the properties of the open window;

program code for using image processing to detect scroll bars within the application data of the open window;

program code for highlighting an area of the screen area;

program code for annotating the screen area with comments;

program code for saving metadata of the screen area, including the open window, the highlighting of the area of the screen area, the annotating of the screen area with comments, and the scroll bars, as a metadata file, wherein the metadata file re-creates the screen area including the open window with the application data in a correct position within the application;

program code for sending the metadata file to a recipient machine, wherein an alternative application that is available on the recipient machine is used in response to the application being unavailable on the recipient machine;

program code for re-creating the screen area at the recipient machine using the metadata file, wherein the re-creating of the screen area includes retrieving and re-creating icons in the screen area, wherein a placeholder is used when an icon is not retrieved;

program code for applying a scaling factor to the re-created screen area in response to a screen size on the recipient machine being different from a screen size on the source machine;

program code for annotating the re-created screen area;

program code for updating the metadata file with the annotating of the re-created screen area; and program code for sending the updated metadata file to the source machine.

3. The computer program product of claim 2, wherein the metadata file is less than 20 KB in size.

* * * * *